(No Model.)

H. & J. P. SCHEELE & H. A. RUST.
TROLLEY.

No. 521,184. Patented June 12, 1894.

Witnesses.
Geo. W. Young.
N. E. Oliphant.

Inventors:
Henry Scheele,
John P. Scheele,
Henry A. Rust.
By H. G. Underwood.
O. Kouvey

THE NATIONAL LITHOGRAPHING COMPANY,
WASHINGTON, D. C.

UNITED STATES PATENT OFFICE.

HENRY SCHEELE, JOHN P. SCHEELE, AND HENRY A. RUST, OF MILWAUKEE, WISCONSIN.

TROLLEY.

SPECIFICATION forming part of Letters Patent No. 521,184, dated June 12, 1894.

Application filed February 23, 1894. Serial No. 501,096. (No model.)

*To all whom it may concern:*

Be it known that we, HENRY SCHEELE, JOHN P. SCHEELE, and HENRY A. RUST, citizens of the United States, and residents of Milwaukee, in the county of Milwaukee, and in the State of Wisconsin, have invented certain new and useful Improvements in Trolleys; and we do hereby declare that the following is a full, clear, and exact description thereof.

Our invention has for its object to prevent accidental disengagement of a trolley-wheel from its carrier, as well as to provide for automatic lubrication and to compensate for wear; these objects being obtained by certain peculiarities of construction and combination of parts hereinafter specified with reference to the accompanying drawings and subsequently claimed.

Figure 1:
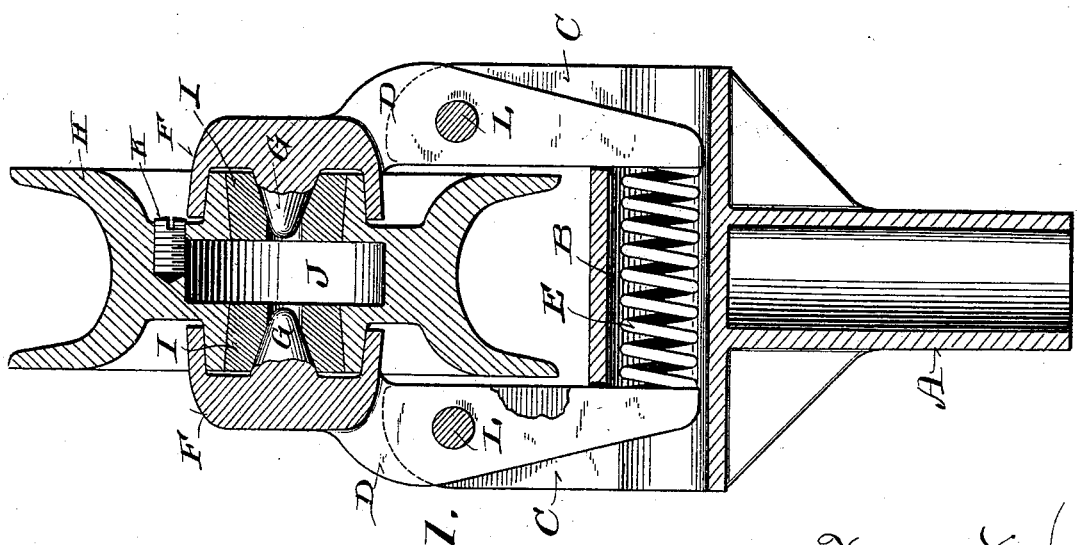

In the drawings: Figure 1 represents a vertical transverse section illustrating the construction and arrangement of parts involved in the preferred form of our invention, and Fig. 2, a side elevation showing certain of the parts broken away.

Referring by letter to the drawings, A represents the pole-socket end of a preferably cast metal head having a horizontal chamber B and upwardly extended ears C, the latter being arranged in pairs at the extremities of said chamber. Pivotally connected to each pair of ears C is a lever D that has its lower end opposed by a spring E under compression within the chamber portion B of the head, and the upper end of the lever is in the form of a cap F having a central cone-shaped bearing G for the hub of a trolley-wheel H, said hub being preferably bushed with hardened steel sleeves I bored to conform to the bearings on the levers.

From the foregoing it will be seen that the spring is on the side of the lever-pivots opposite the bearings and operates as a means to keep said bearings up to place in the wheel, and the hub of the latter being engaged with the cap-shaped ends of said levers accidental displacement of said wheel is rendered impossible, while at the same time there is compensation for wear on the aforesaid bearings.

In order to provide for automatic lubrication of the bearings the trolley-wheel is made hollow to form an internal chamber J for dope or other suitable material, this chamber being open to the hub-bore of said wheel. The inlet to the lubricant chamber is closed by a screw-plug K or other suitable device.

Figure 2:
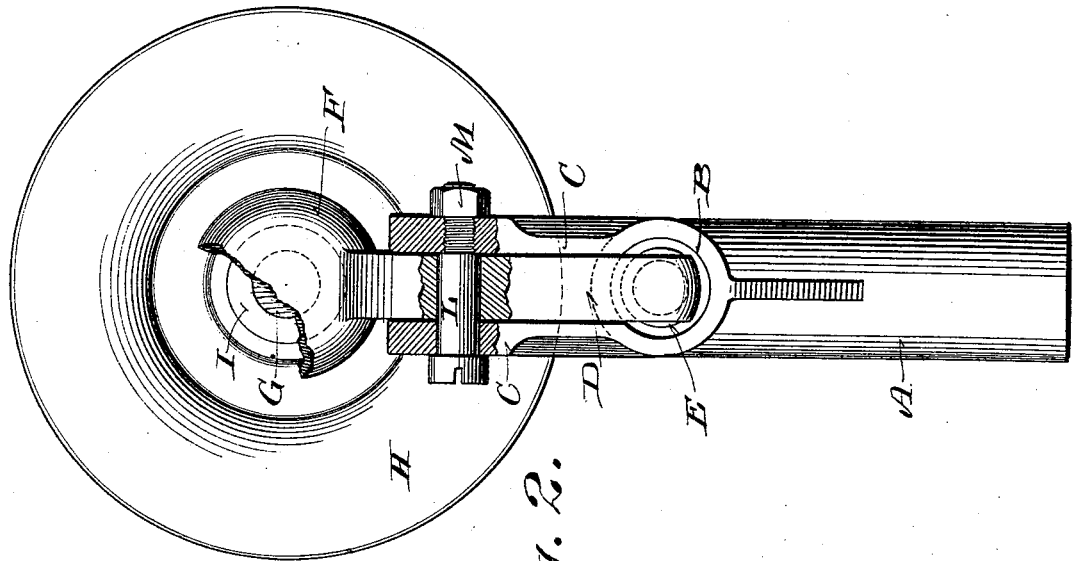

As a matter of detail we prefer that the pivot L for each lever be headed at one end and screw-threaded at the other, this screw-threaded end to engage a tapped opening in one of the head-ears and receive a check-nut M, as illustrated in Fig. 2.

If at any time it is necessary or desirable to remove the trolley-wheel, one or the other of the levers D is detached from the pole-head, the corresponding pivot L being withdrawn to permit this operation.

Having thus described our invention, what we claim as new, and desire to secure by Letters Patent, is—

1. The combination of a suitable head having pivotal levers provided with bearings, a trolley wheel loose on these bearings, and a spring under compression between the levers on that side of their pivots opposite said bearings, substantially as set forth.

2. The combination of a suitable head having pivotal levers provided with bearings, a spring under compresion between the levers on that side of their pivots opposite the bearings, and a trolley-wheel that is loose on said bearings and has an internal lubricant chamber in communication with its hub-bore, substantially as set forth.

3. The combination of a suitable head having a trolley-wheel having its hub bushed with hardened steel sleeves, pivotal levers provided with bearings engaging the sleeves, and a spring under compression between the levers on that side of their pivots opposite said bearings, substantially as set forth.

4. The combination of a suitable head having pivotal levers provided with hub caps and bearings for a trolley wheel, and a spring under compression between the levers on that side of their pivots opposite said bearings, substantially as set forth.

5. The combination of a head having a pole-socket lower end, a horizontal chamber and upwardly extended ears arranged in pairs at the extremities of the chamber; a lever pivoted between the ears in each pair and provided with a bearing surrounded by a cap, a trolley-wheel having its hub engaged by the caps and bearings on the levers, and a spring in the head-chamber under compression between said levers on that side of their pivots opposite said bearings, substantially as set forth.

In testimony that we claim the foregoing we have hereunto set our hands, at Milwaukee, in the county of Milwaukee and State of Wisconsin, in the presence of two witnesses.

HENRY SCHEELE.
    JOHN P. SCHEELE.
    HENRY A. RUST.

Witnesses:
 N. E. OLIPHANT,
 HENRY DANKIRT.